United States Patent
Chen

(10) Patent No.: US 12,531,124 B2
(45) Date of Patent: Jan. 20, 2026

(54) PROGRAMMING VOLTAGE SUPPLY AND PROGRAMMING VOLTAGE GENERATING METHOD

(71) Applicant: Winbond Electronics Corp., Taichung (TW)

(72) Inventor: Chung-Zen Chen, HsinChu (TW)

(73) Assignee: Winbond Electronics Corp., Taichung (TW)

( * ) Notice: Subject to any disclaimer, the term of this patent is extended or adjusted under 35 U.S.C. 154(b) by 117 days.

(21) Appl. No.: 18/741,805

(22) Filed: Jun. 13, 2024

(65) Prior Publication Data
US 2025/0308597 A1  Oct. 2, 2025

(30) Foreign Application Priority Data

Apr. 1, 2024  (TW) .................................. 113112343

(51) Int. Cl.
*G11C 16/30*  (2006.01)
*G11C 16/10*  (2006.01)
*G11C 16/32*  (2006.01)

(52) U.S. Cl.
CPC ............ *G11C 16/102* (2013.01); *G11C 16/30* (2013.01); *G11C 16/32* (2013.01)

(58) Field of Classification Search
CPC ....... G11C 16/102; G11C 16/30; G11C 16/32; G11C 16/10
See application file for complete search history.

(56) References Cited

U.S. PATENT DOCUMENTS

| 6,212,101 | B1* | 4/2001 | Lee | ................. | G11C 16/12 |
| | | | | | 365/185.24 |
| 8,730,753 | B2 | 5/2014 | Yamasaki | | |
| 8,963,625 | B2* | 2/2015 | Miwa | ................ | G05F 3/02 |
| | | | | | 307/64 |
| 2007/0013420 | A1* | 1/2007 | Jin | ................ | G11C 5/14 |
| | | | | | 327/158 |
| 2008/0170446 | A1* | 7/2008 | Kwon | ............ | G11C 11/4074 |
| | | | | | 365/230.03 |

FOREIGN PATENT DOCUMENTS

CN  113346739  9/2021

* cited by examiner

*Primary Examiner* — Khamdan N. Alrobaie
(74) *Attorney, Agent, or Firm* — JCIPRNET

(57) ABSTRACT

A programming voltage supply and a programming voltage generating method are provided. The programming voltage supply includes a plurality of controllers and a plurality of voltage generators. The controllers respectively receive a plurality of cut-off signals, and commonly receive a clock signal. The controllers generate a plurality of activation signals according to the cut-off signals respectively. The voltage generators are configured to provide a programming voltage. In a first stage, the voltage generators are commonly activated to provide the programming voltage, and in a second stage, a plurality of first voltage generators of the voltage generators are sequentially turned-off one by one according to the corresponding activation signals respectively.

19 Claims, 6 Drawing Sheets

PROGRAMMING VOLTAGE SUPPLY AND PROGRAMMING VOLTAGE GENERATING METHOD

CROSS-REFERENCE TO RELATED APPLICATION

This application claims the priority benefit of Taiwan application serial no. 113112343, filed on Apr. 1, 2024. The entirety of the above-mentioned patent application is hereby incorporated by reference herein and made a part of this specification.

BACKGROUND

Technical Field

The disclosure relates to a programming voltage supply and a programming voltage generating method, and more particularly, to a programming voltage supply and a programming voltage generating method that may reduce power consumption.

Description of Related Art

Referring to an architectural diagram of a flash memory cell shown in FIG. 1A, a flash memory cell 100 with a tunnel oxide (ETOX) structure is provided. The flash memory cell 100 has a source structure S1, a drain structure D1, a substrate BK, and a gate structure formed by a control gate CG, a silicon oxide-silicon nitride-silicon oxide structure ONO, and a floating gate FG. In a programming operation, the source structure S1 and the substrate BK may receive a voltage of, for example, 0 volts (V), and the control gate CG may receive a gate voltage VGT of, for example, 9V, while the drain structure D1 may receive a programming voltage VPPD.

Hereinafter, referring to a characteristic curve diagram of the programming operation of the flash memory cell 100 shown in FIG. 1B, a curve 110 is a change in a threshold voltage Vth of the flash memory cell 100 with time, and a curve 120 is a change in a drain-source current I of the flash memory cell 100 with time. According to FIG. 1B, during a programming process, if the programming voltage VPPD is continuously provided to the drain structure D1, the threshold voltage Vth of the flash memory cell 100 will gradually increase to a stable value, and the drain-source current I will gradually decrease to a stable value. At this time, keep supplying the programming voltage VPPD with the same driving capability to the drain structure D1 will not cause much change in the threshold voltage Vth and the drain-source current I. Therefore, unnecessary power consumption will be caused.

SUMMARY

The disclosure provides a programming voltage supply and a programming voltage generating method, which may effectively save required power consumption.

A programming voltage supply in the disclosure includes a plurality of controllers and a plurality of voltage generators. The controllers respectively receive a plurality of cut-off signals and commonly receive a clock signal. The controllers generate a plurality of activation signals according to the cut-off signals respectively. The voltage generators are coupled to the controllers to respectively receive the activation signals. A plurality of output ends of the voltage generators are commonly coupled to an output end of the programming voltage supply to provide a programming voltage. In a first stage, the voltage generators are commonly activated to provide the programming voltage, and in a second stage, a plurality of first voltage generators of the voltage generators are sequentially turned off one by one according to the corresponding activation signals.

A programming voltage generating method in the disclosure includes the following. Based on a clock signal, a plurality of activation signals are generated according to a plurality of cut-off signals respectively. A plurality of output ends of a plurality of voltage generators are coupled to each other to provide a programming voltage. In a first stage, the voltage generators are commonly activated to provide the programming voltage. In a second stage, a plurality of first voltage generators of the voltage generators are sequentially turned off one by one according to the corresponding activation signals respectively.

DETAILED DESCRIPTION OF DISCLOSED EMBODIMENTS

Figure 1A:
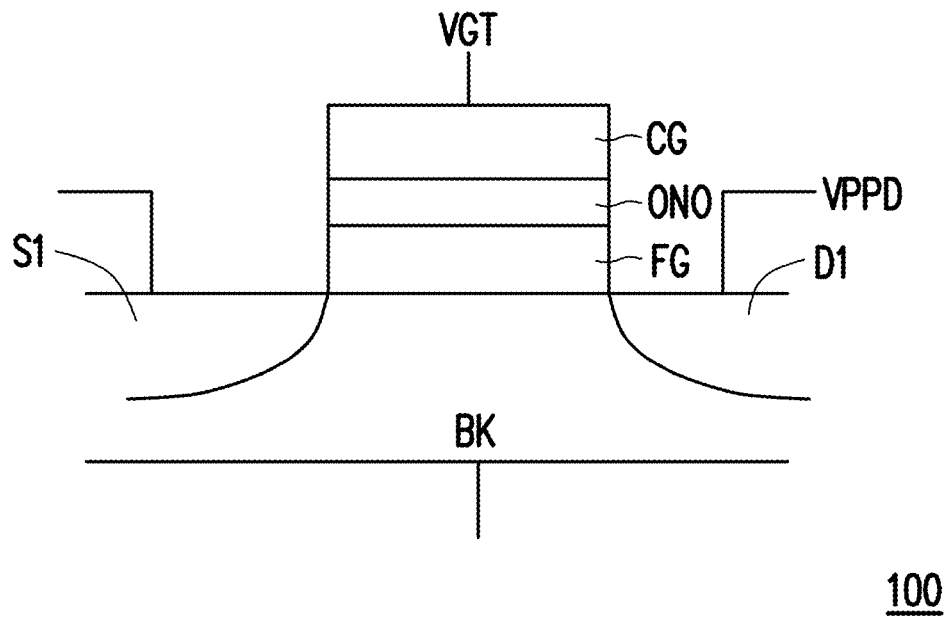
FIG. 1A is an architectural diagram of a flash memory cell.
Figure 1B:
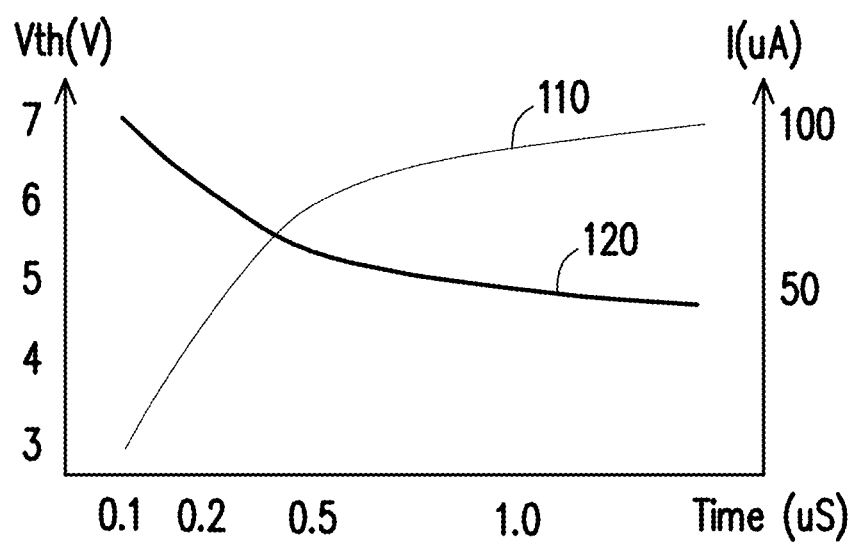
FIG. 1B is a characteristic curve diagram of a programming operation of the flash memory cell 100.
Figure 2:
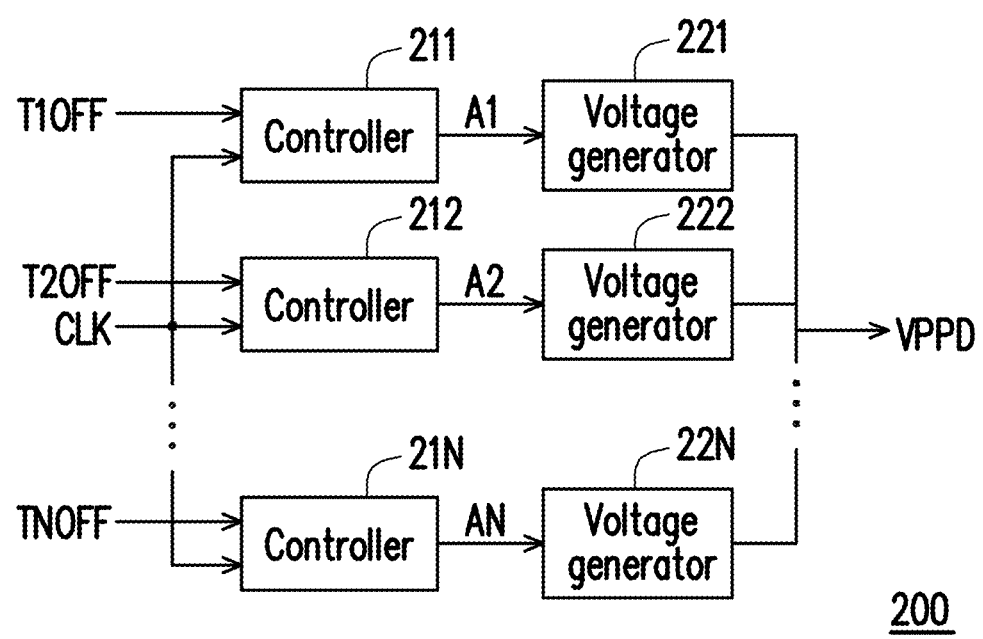
FIG. 2 is a schematic diagram of a programming voltage supply according to an embodiment of the disclosure.

Referring to FIG. 2, FIG. 2 is a schematic diagram of a programming voltage supply according to an embodiment of the disclosure. A programming voltage supply 200 is configured to supply the programming voltage VPPD as shown in FIG. 1A. The programming voltage supply 200 includes controllers 211 to 21N and voltage generators 221 to 22N. The controllers 211 to 21N correspond to the voltage generators 221 to 22N respectively. Each of the controllers 211 to 21N is coupled to each of the corresponding voltage generators 221 to 22N. The controllers 211 to 21N receive cut-off signals T1OFF to TNOFF respectively, and commonly receive a clock signal CLK. The controllers 211 to 21N generate activation signals A1 to AN according to the cut-off signals T1OFF to TNOFF and the clock signal CLK respectively.

In detail, each of the controllers 211 to 21N may generate each of the activation signals A1 to AN by passing or masking the clock signal CLK according to the received cut-off signals T1OFF to TNOFF. For example, taking the controller 211 as an example, when the cut-off signal T1OFF is a logic value of 1, the controller 211 may generate the corresponding activation signal A1 by passing the clock signal CLK. At this time, the activation signal A1 may be equal to the clock signal CLK. In contrast, when the cut-off signal T1OFF is a logic value of 0, the controller 211 may mask the clock signal CLK to generate the activation signal A1. At this time, the activation signal A1 may be a fixed logic value, such as the logic value of 0 or 1.

The voltage generators 221 to 22N may be charge pumps. Each of the voltage generators 221 to 22N performs a charge pump operation and generates the programming voltage VPPD by pumping up a reference voltage when the corresponding activation signal is equal to the clock signal CLK. In contrast, each of the voltage generators 221 to 22N stops performing the charge pump operation and stops generating the programming voltage VPPD.

Here, it is noted that in this embodiment, a programming operation of a memory cell may be divided into a first stage and a second stage. In the first stage, all the voltage generators 221 to 22N may be activated to perform a voltage pump operation and commonly provide the programming voltage VPPD. Under such conditions, the programming voltage VPPD provided by the programming voltage supply 200 may have maximum output power. In the second stage, a plurality of first voltage generators of the voltage generators 221 to 22N may be sequentially turned off one by one according to the received activation signals, thereby gradually reducing output power (i.e., an output current) of the programming voltage VPPD.

For further description, a plurality of the voltage generators 221 to 22N are set as the first voltage generators, and the remaining the voltage generators 221 to 22N are set as the second voltage generators. The number of second voltage generators may be one or more. When in the second stage, the controllers corresponding to the first voltage generators may sequentially disable the generated activation signals one by one according to the received cut-off signals. The cut-off signals may be sequentially disabled one by one according to a time delay. In this way, the first voltage generators sequentially stop generating the programming voltage VPPD one by one based on the above time delay. On the other hand, the second voltage generators continue to generate the programming voltage VPPD, thereby maintaining the basic driving capability of the programming voltage VPPD.

The first stage and the second stage may be determined according to changes in a voltage value of the programming voltage VPPD. In a programming operation of a memory, when the programming voltage VPPD does not achieve a target voltage, the programming voltage supply 200 may be in the first stage. Subsequently, in the same programming operation, after the first phase, when the programming voltage VPPD achieves the target voltage, the programming voltage supply 200 may enter the second phase.

Incidentally, the number of second voltage generators may be set according to the basic driving capability required by the programming voltage VPPD in the programming operation, and the remaining voltage generators 221 to 22N may all be set as the first voltage generators. In addition, the target voltage may be set according to a maximum value of the programming voltage VPPD required in the programming operation.

According to the above description, in the embodiment of the disclosure, when the first phase of the programming operation is completed, and the second phase is entered, the programming voltage supply 200 may reduce unnecessary power waste by turning off the first voltage generators one by one. In addition, by turning off the first voltage generators one by one, generation of an instantaneous current may be avoided, and a current peak value of the output current may be effectively reduced, which may reduce possible electromagnetic interference and improve stability of the programming operation.

Figure 3:
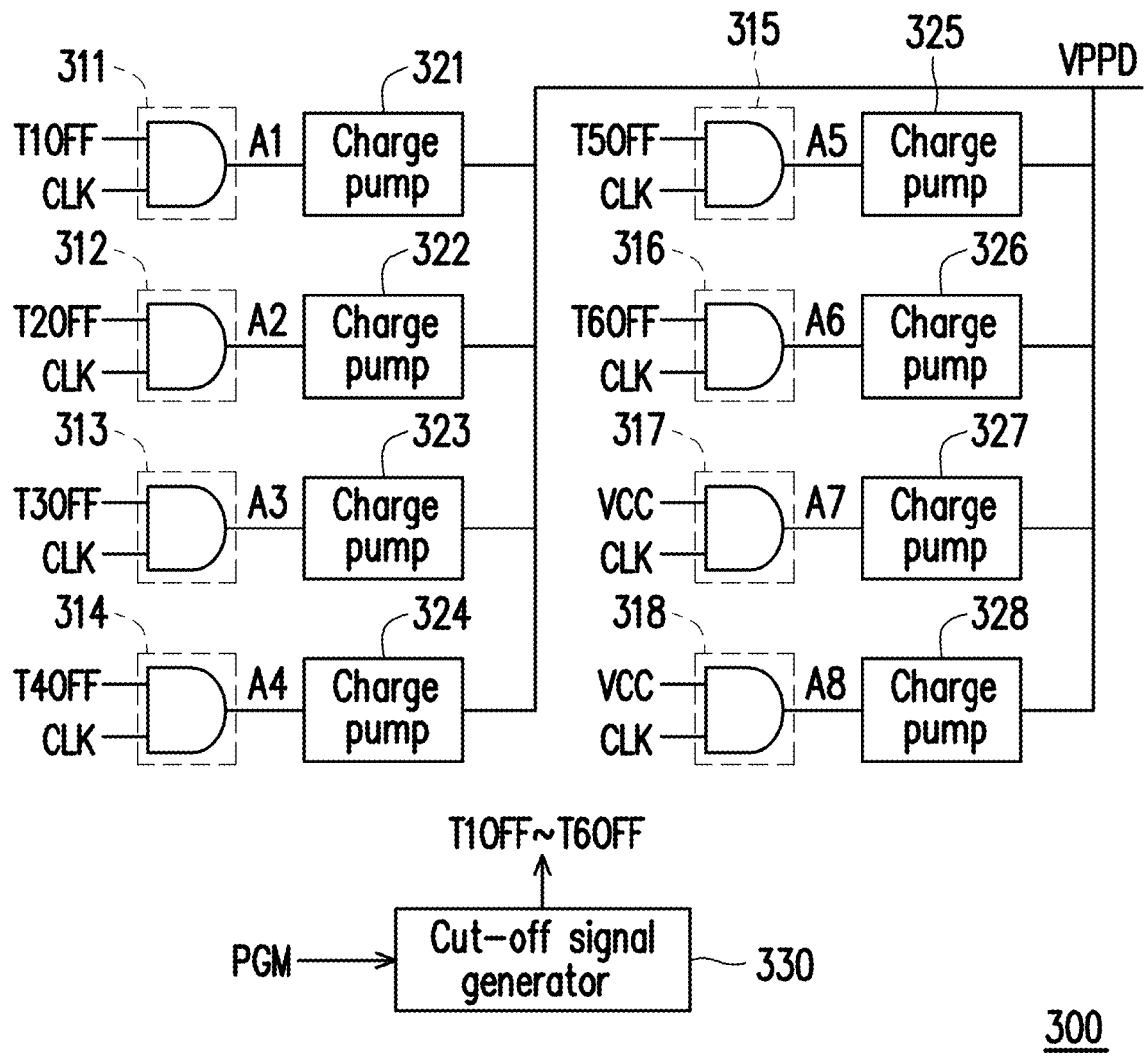
FIG. 3 is a schematic diagram of a programming voltage supply according to another embodiment of the disclosure.

Hereinafter, please refer to FIG. 3. FIG. 3 is a schematic diagram of a programming voltage supply according to another embodiment of the disclosure. A programming voltage supply 300 includes controllers 311 to 318, charge pumps 321 to 328, and a cut-off signal generator 330. The controllers 311 to 31N may be AND gates. The charge pumps 321 to 328 are used as voltage generators. The controllers 311 to 318 commonly receive the clock signal CLK. The controllers 311 to 316 receive the cut-off signals T1OFF to T6OFF respectively, and the controllers 317 and 318 receive power voltages VCC as the cut-off signals. The cut-off signal generator 330 is coupled to the controllers 311 to 316 and configured to provide the cut-off signals T1OFF to T6OFF.

In this embodiment, the charge pumps 321 to 326 corresponding to the controllers 311 to 316 respectively may be set as the first voltage generators, and the charge pumps 327 and 328 corresponding to the controllers 317 and 318 respectively may be set as the second voltage generators.

In addition, output ends of the charge pumps 321 to 328 are coupled to each other and commonly provide the programming voltage VPPD.

In terms of operation details, the controllers 311 to 316 are configured to perform a logic operation on the received clock signal CLK and cut-off signals T1OFF to T6OFF respectively, and thereby generate the activation signals A1 to A6. The controllers 317 and 318 generate the activation signals A7 and A8 respectively by passing the clock signal CLK unconditionally.

In the programming operation, in the first stage, the cut-off signal generator 330 may provide the cut-off signals T1OFF to T6OFF with the logic values of 1 to the controllers 311 to 316. In this way, the controllers 311 to 318 may respectively generate the activation signals A1 to A8 through the clock signal CLK. Correspondingly, the charge pumps 321 to 328 may activate execution of a voltage pumping operation according to the received activation signals A1 to A8 (same as the clock signal CLK), and commonly generate the programming voltage VPPD.

Then, after entering the second stage, the cut-off signal generator 330 may sequentially disable the cut-off signals T1OFF to T6OFF one by one (transition to the logic value of 0) according to a preset time delay. In this way, the controllers 311 to 316 may sequentially disable the generated activation signals A1 to A6 one by one (transition to the logic value of 0), and sequentially turn off the charge pumps 321 to 326 one by one.

It is worth mentioning that the cut-off signal generator 330 may generate the cut-off signals T1OFF to T6OFF according to a programming operation instruction signal PGM. For relevant details, reference may be made to the following implementation.

Figure 4:
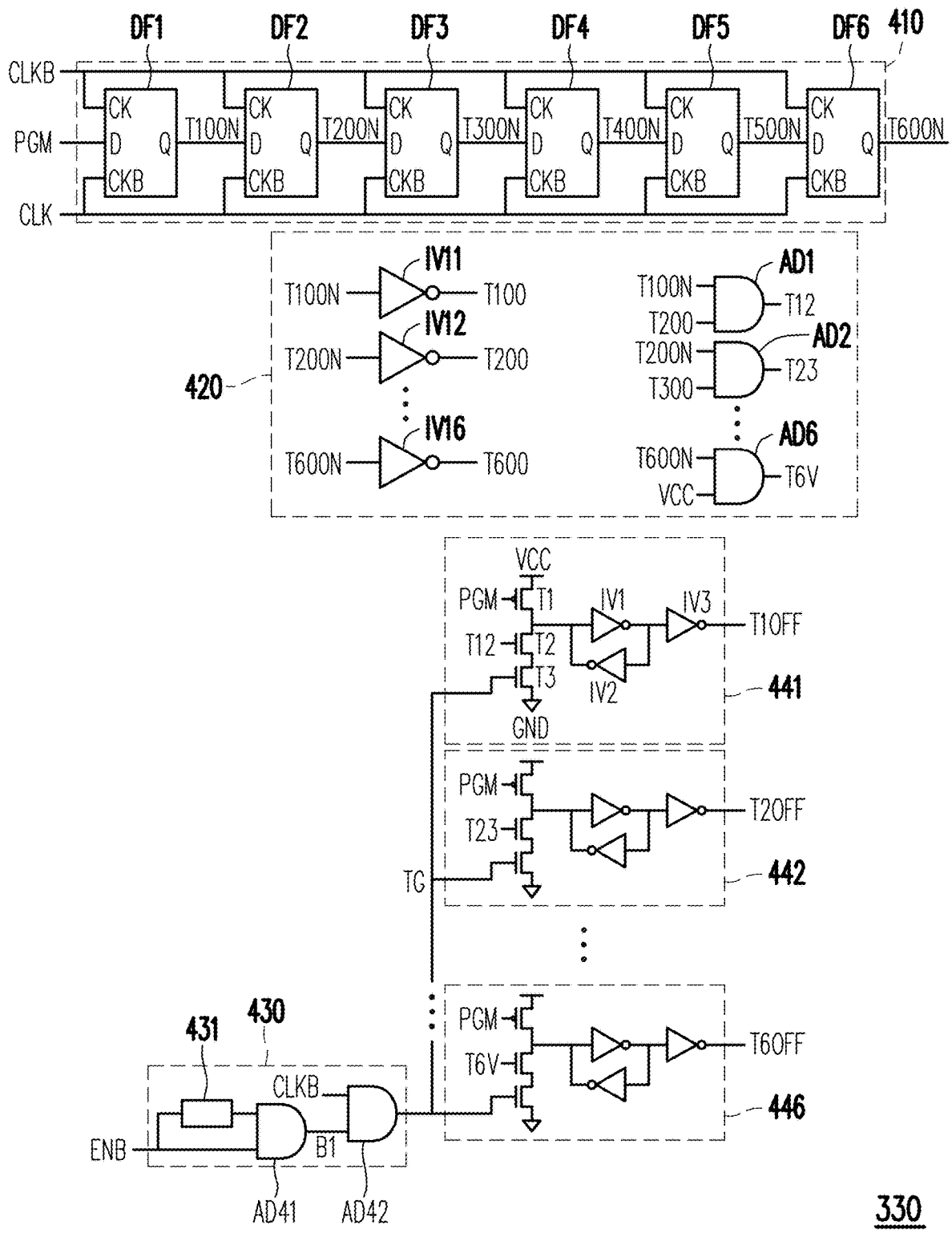
FIG. 4 is a schematic diagram of an implementation of a cut-off signal generator in embodiment of FIG. 3 according to the disclosure.
Figure 5:
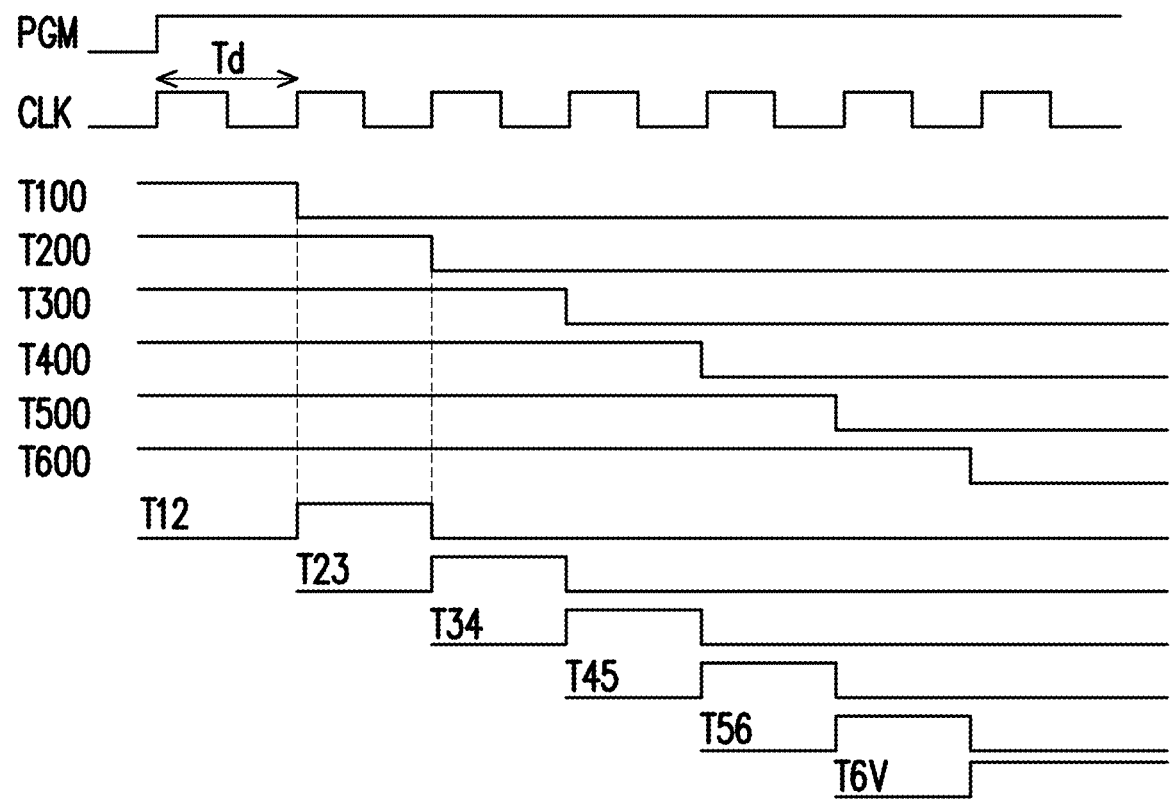
FIG. 5 is an operation waveform diagram of the cut-off signal generator in the embodiment of FIG. 4.

Hereinafter, referring to FIGS. 4 and 5, FIG. 4 is a schematic diagram of an implementation of a cut-off signal generator in embodiment of FIG. 3 according to the disclosure, and FIG. 5 is an operation waveform diagram of the cut-off signal generator in the embodiment of FIG. 4. The cut-off signal generator 330 includes a shift register circuit 410, a logic operation circuit 420, a trigger circuit 430, and latch circuits 441 to 446. The shift register circuit 410 is formed by flip-flops DF1 to DF6. The flip-flops DF1 to DF6 are sequentially coupled in series. A data end D of the flip-flop DF1 of the first level receives the programming operation instruction signal PGM, and data ends of the flip-flops DF2 to DF6 of the subsequent level are coupled to output ends Q of the flip-flops DF1 to DF5 of the previous level. Inverted clock ends CKB of the flip-flops DF1 to DF6 receive the clock signal CLK, and clock ends CK of the flip-flops DF1 to DF6 receive an inverted clock signal CLKB. The inverted clock signal CLKB is an inverted signal of the clock signal CLK.

The flip-flops DF1 to DF6 are configured to sequentially delay the programming operation instruction signal PGM according to the clock signal CLK, and generate multi-level shift signals T100N to T600N at the output ends Q respectively. When the programming operation enters the second stage, the programming operation instruction signal PGM may transition from the logic value of 0 to the logic value of 1, for example. Correspondingly, the shift signals T100N to T600N may be sequentially transitioned to the logic value of 1 one by one according to a delay time. The delay time is the same as a period Td of the clock signal CLK.

The logic operation circuit 420 includes inverters IV11 to IV16 and AND gates AD1 to AD6. The inverters IV11 to IV16 receive the shift signals T100N to T600N respectively, and generate inverted signals T100 to T600 of the shift signals T100N to T600N respectively. Each of the AND gates AD1 to AD6 receives the two consecutive levels of the multi-level inverted signals T100 to T600 and performs the logic operation. The AND gates AD1 to AD6 generate first signals T12, T23, T34, T45, T56, and T6V respectively. The first signals T12, T23, T34, T45, T56, and T6V may respectively have six positive pulse waves that are enabled sequentially and do not overlap. It is worth mentioning that since the inverted signals T100 to T600 only have sixth levels, one input end of the AND gate AD6 may receive the inverted signal T600 of the sixth level, while another input end of the AND gate AD6 may receive the power voltage VCC when there is no inverted signal from the seventh level.

The latch circuits 441 to 446 receive the first signals T12, T23, T34, T45, T56, and T6V respectively, and commonly receive a trigger signal TG. In terms of circuit details, the latch circuits 441 to 446 may have the same circuit architecture.

Taking the latch circuit 441 as an example, the latch circuit 441 includes transistors T1 to T3 and inverters IV1 to IV3. A first end of the transistor T1 receives the power voltage VCC. A control end of the transistor T1 receives the programming operation instruction signal PGM. A second end of the transistor T1 is coupled to a first end of the transistor T2. A control end of the transistor T2 receives the corresponding first signal T12, and a second end of the transistor T2 is coupled to a first end of the transistor T3. A control end of the transistor T3 receives the trigger signal TG. A second end of the transistor T3 is coupled to a reference ground end GND. In addition, an input end of the inverter IV1 is coupled to the second end of the transistor T1 and coupled to an output end of the inverter IV2. An output end of the inverter IV1 is coupled to an input end of the inverter IV2 to form a bus holder. An input end of the inverter IV3 is coupled to the output end of the inverter IV1, and an output end of the inverter IV3 is configured to provide the cut-off signal T1OFF.

The latch circuits 441 to 446 are configured to latch the corresponding first signals T12, T23, T34, T45, T56, and T6V respectively according to the trigger signal TG, and generate the cut-off signals T1OFF to T6OFF respectively.

The trigger circuit 430 includes a delayer 431 and AND gates AD41 and AD42. The delayer 431 and the AND gate AD41 may form a debounce circuit. The debounce circuit generates a second signal B1 that is also the logic value of 1 when an enable signal ENB is stably transitioned to the logic value of 1 through the provided delayer 431. The AND gate AD42 performs an AND logic operation on the second signal B1 and the inverted clock signal CLKB, thereby generating the trigger signal TG.

Incidentally, a length of the delay time provided by the delayer 431 may be determined by a designer according to requirements for a circuit design, and there is no fixed limit.

Here, it is noted that in this embodiment, all logic gates may be replaced by one or more equivalent logic gates. The illustration in FIG. 4 is only an example for description and is not intended to limit the scope of implementation in the disclosure. For example, a single AND gate may be replaced by a single NAND gate and an inverter, or the AND gate may be replaced by a NOR gate combined with the inverter. Relevant replacement methods are well known to those with ordinary knowledge in the art. Thus, details in this regard will not be further reiterated in the following.

Figure 6:
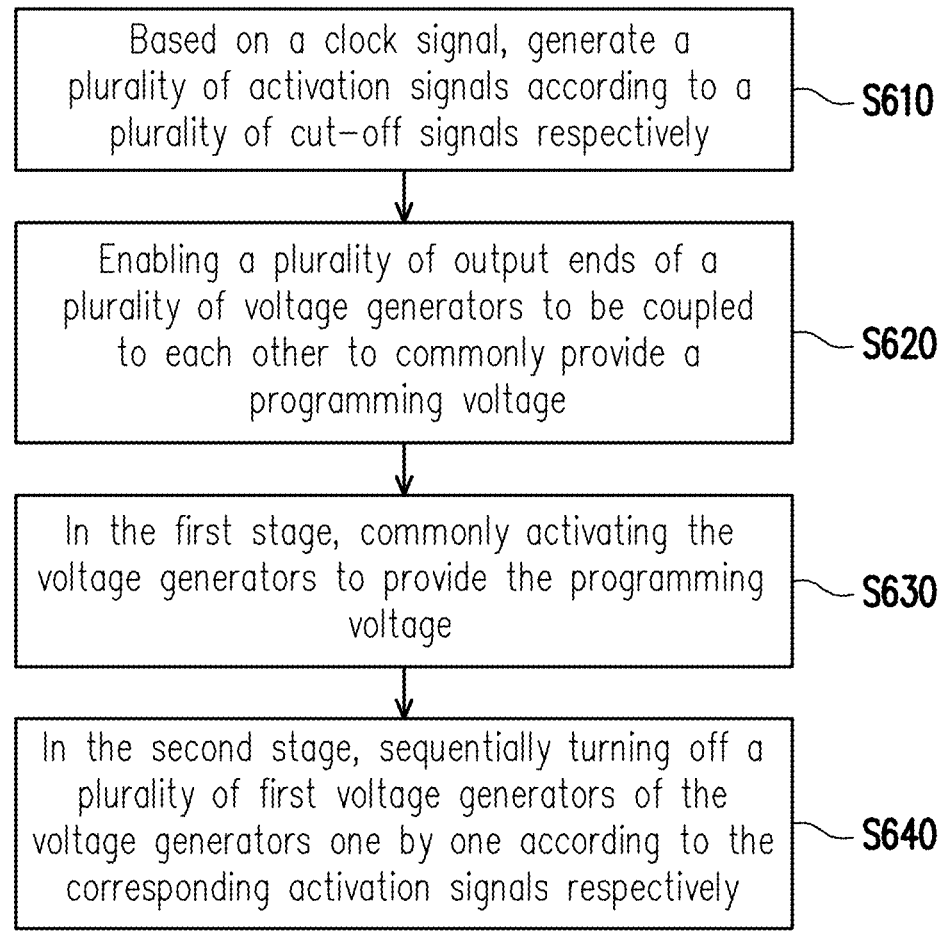
FIG. 6 is a flow chart of a programming voltage generating method according to an embodiment of the disclosure.

Hereinafter, referring to FIG. 6, FIG. 6 is a flow chart of a programming voltage generating method according to an embodiment of the disclosure. In the programming operation, in step S610, based on a clock signal, a plurality of activation signals are generated according to a plurality of cut-off signals. In step S620, a plurality of output ends of a plurality of voltage generators are coupled to each other to commonly provide a programming voltage. In step S630, in the first stage, the voltage generators are commonly activated to provide the programming voltage. In step S640, in the second stage, a plurality of first voltage generators of the voltage generators are sequentially turned off one by one according to the corresponding activation signals respectively.

Implementation details of steps S610 to S640 have been described in detail in the foregoing embodiments and implementations. Therefore, the same details will not be repeated in the following.

Based on the above, in the disclosure, the voltage generators are used to commonly provide the programming voltage of the memory. In the first stage of the programming operation, all the voltage generators are activated at the same time to generate the programming voltage, and in the second stage, the first voltage generators of the voltage generators are sequentially turned off one by one. In this way, the programming voltage supply according to the embodiment of the disclosure may reduce the required power consumption, effectively reduce the generation of the instantaneous current during the process of turning off the voltage generator, and may effectively reduce the peak value of the current and reduce the possible electromagnetic interference.

What is claimed is:

1. A programming voltage supply, comprising:
    a plurality of controllers respectively receiving a plurality of cut-off signals and commonly receiving a clock signal, wherein the controllers generate a plurality of activation signals according to the cut-off signals respectively; and
    a plurality of voltage generators coupled to the controllers to respectively receive the activation signals, wherein a plurality of output ends of the voltage generators are commonly coupled to an output end of the programming voltage supply to provide a programming voltage,
    wherein in a first stage, the voltage generators are commonly activated to provide the programming voltage, and in a second stage, a plurality of first voltage generators of the voltage generators are sequentially turned off one by one according to the corresponding activation signals.

2. The programming voltage supply according to claim 1, wherein in a programming operation of a corresponding memory, when the programming voltage does not achieve a target voltage, the programming voltage supply is in the first stage.

3. The programming voltage supply according to claim 2, wherein in the programming operation, after the first stage, when the programming voltage achieves the target voltage, the programming voltage supply enters the second stage.

4. The programming voltage supply according to claim 1, wherein the voltage generators are voltage pumps, and each of the controller generates each of the corresponding activation signals by passing or masking the clock signal according to each of the corresponding cut-off signals.

5. The programming voltage supply according to claim 1, wherein in the second stage, the activation signals corresponding to the first voltage generators are sequentially disabled one by one according to a delay time.

6. The programming voltage supply according to claim 1, further comprising:
a cut-off signal generator coupled to the controllers and generating the cut-off signals according to a programming operation instruction signal.

7. The programming voltage supply according to claim 6, wherein the cut-off signal generator comprises:
a shift register circuit shifting the programming operation instruction signal to generate multi-level shift signals;
a logic operation circuit coupled to the shift register circuit and performing a logic operation on two consecutive levels of the multi-level shift signals to generate a plurality of first signals respectively;
a trigger circuit generating a trigger signal according to the clock signal and an enable signal; and
a plurality of latch circuits coupled to the logic operation circuit and the trigger circuit, and respectively latching the first signals according to the trigger signal to generate the activation signals.

8. The programming voltage supply according to claim 7, wherein the trigger circuit comprises a debounce circuit generating a second signal according to a transition state of the enable signal and generating the trigger signal according to the second signal and the clock signal.

9. The programming voltage supply according to claim 7, wherein each of the latch circuits comprises:
a first transistor having a first end to receive a power voltage, wherein a control end of the first transistor receives the programming operation instruction signal;
a second transistor having a first end coupled to a second end of the first transistor, wherein a control end of the second transistor receives each of the corresponding first signals;
a third transistor having a first end coupled to a second end of the second transistor, wherein a control end of the third transistor receives the trigger signal, and a second end of the third transistor is coupled to a reference ground end; and
a bus holder coupled to the second end of the first transistor to provide each of the corresponding activation signals.

10. The programming voltage supply according to claim 9, wherein the bus holder comprises:
a first inverter having an input end coupled to the second end of the first transistor; and
a second inverter having an input end coupled to an output end of the first inverter, wherein an output end of the second inverter is coupled to the input end of the first inverter.

11. The programming voltage supply according to claim 10, wherein the bus holder further comprises:

a third inverter having an input end coupled to the output end of the first inverter, wherein an output end of the third inverter generates each of the corresponding activation signals.

12. The programming voltage supply according to claim 1, wherein in the second stage, at least one second voltage generator of the voltage generators other than the first voltage generators remains activated.

13. A programming voltage generating method, comprising:
based on a clock signal, generating a plurality of activation signals according to a plurality of cut-off signals respectively;
enabling a plurality of output ends of a plurality of voltage generators to be coupled to each other to provide a programming voltage;
in a first stage, commonly activating the voltage generators to provide the programming voltage; and
in a second stage, sequentially turning off a plurality of first voltage generators of the voltage generators one by one according to the corresponding activation signals respectively.

14. The programming voltage generating method according to claim 13, further comprising:
in a programming operation of a corresponding memory, when the programming voltage does not achieve a target voltage, enabling a programming voltage supply to be in the first stage; and
after the first stage and when the programming voltage achieves the target voltage, enabling the programming voltage supply to enter the second stage.

15. The programming voltage generating method according to claim 13, wherein based on the clock signal, generating the activation signals according to the cut-off signals respectively comprises:
generating each of the corresponding activation signals by passing or masking the clock signal according to each of the corresponding cut-off signals.

16. The programming voltage generating method according to claim 13, wherein in the second stage, the activation signals are sequentially disabled one by one according to a delay time.

17. The programming voltage generating method according to claim 13, further comprising:
generating the cut-off signals according to a programming operation instruction signal.

18. The programming voltage generating method according to claim 17, wherein generating the cut-off signals according to the programming operation instruction signal comprises:
shifting the programming operation instruction signal to generate multi-level shift signals;
performing a logic operation on two consecutive levels of the multi-level shift signals to generate a plurality of first signals respectively;
generating a trigger signal according to the clock signal and an enable signal; and
respectively latching the first signals according to the trigger signal to generate the activation signals.

19. The programming voltage generating method according to claim 13, further comprising:
in the second stage, enabling at least one second voltage generator of the voltage generators other than the first voltage generators to remain activated.

* * * * *